United States Patent [19]
Krull et al.

[11] 3,718,563
[45] Feb. 27, 1973

[54] POLAROGRAPHIC SENSOR AND MEMBRANE THEREFOR

[75] Inventors: Irwin H. Krull, Garden Grove; Donald N. Martin, Whittier, both of Calif.

[73] Assignee: Beckman Instruments, Inc., Fullerton, Calif.

[22] Filed: Feb. 22, 1971

[21] Appl. No.: 117,633

[52] U.S. Cl............................................204/195 P
[51] Int. Cl.........................G01n 27/30, G01n 27/40
[58] Field of Search.............204/195 P, 1 T; 324/29

[56] References Cited

UNITED STATES PATENTS

| | | | |
|---|---|---|---|
| 3,574,078 | 4/1971 | Hynes et al. | 204/195 P |
| 3,278,408 | 10/1966 | Leonard et al. | 204/195 P |
| 3,617,460 | 11/1971 | Krull et al. | 204/1 T X |
| 3,575,836 | 4/1971 | Sternberg | 204/195 |

Primary Examiner—G. L. Kaplan
Attorney—Thomas L. Peterson and Robert J. Steinmeyer

[57] ABSTRACT

A polarographic sensor comprising a pair of electrodes joined by an electrolyte with a multi-layer gas permeable-essentially ion impermeable membrane separating the electrodes and electrolyte from the sample medium. The layers of the membrane are held together so as to prevent migration of electrolyte therebetween to the region overlying the sensing electrode and to prevent the trapping of gas or liquid between the layers in such region. The outer layer of the membrane is preferably formed of silicone rubber while the next layer is formed of a material which is less permeable to gas and water vapor than the outer membrane, for example Teflon. A polarographic sensor employing such a membrane exhibits good time response and minimal flow sensitivity.

9 Claims, 4 Drawing Figures

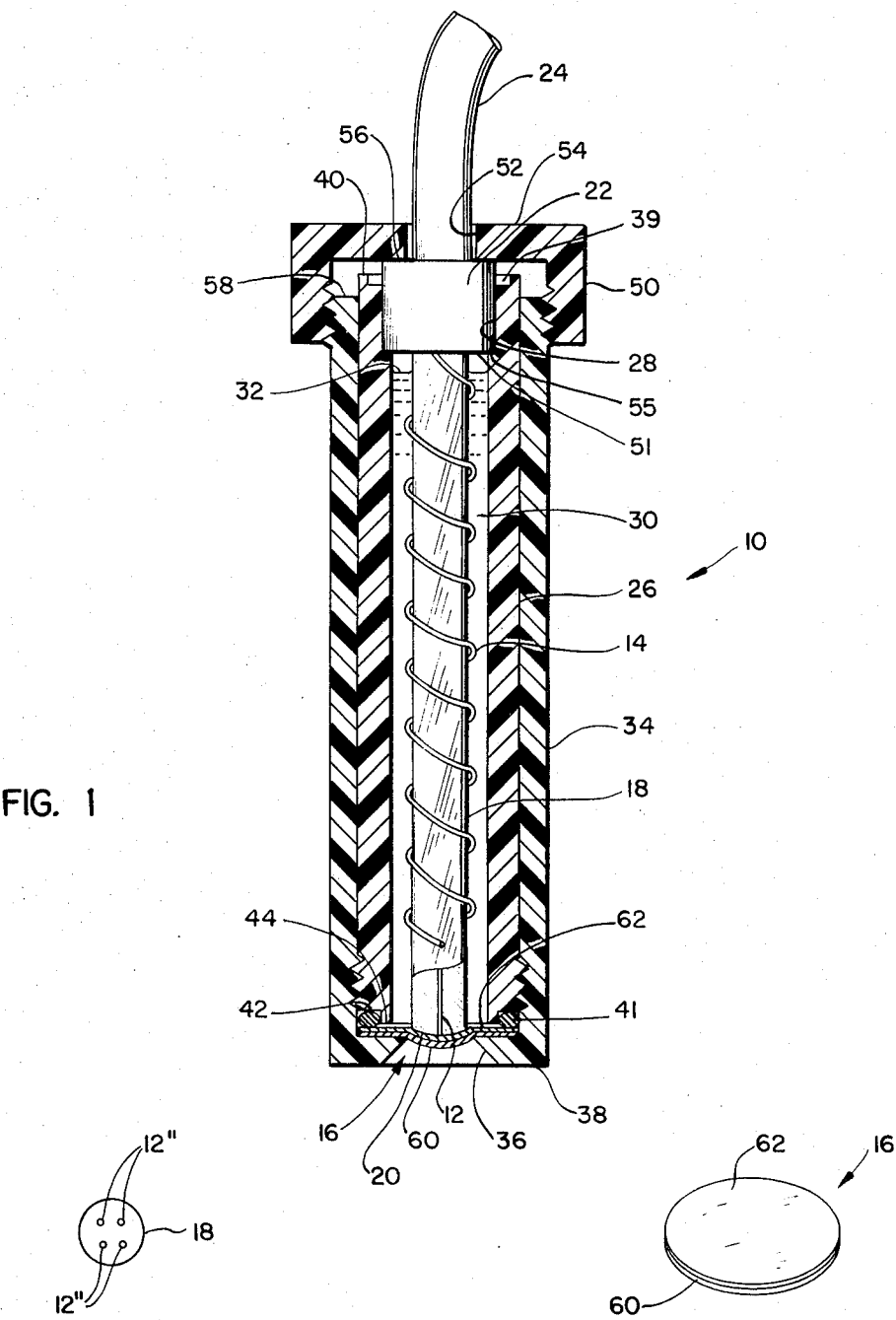

POLAROGRAPHIC SENSOR AND MEMBRANE THEREFOR

BACKGROUND OF THE INVENTION

1. Field of the Invention

This invention relates generally to a polarographic sensor for measuring a gaseous constituent in a sample medium and, more particularly, to the membrane employed in the sensor for separating the electrodes and electrolyte therein from the sample medium.

2. Description of the Prior Art

Polarographic sensors of the type to which this invention pertains generally comprise a pair of electrodes joined by an electrolyte and separated from the sample medium to be analyzed by means of a membrane that is permeable to a gaseous constituent in the sample, but is impermeable to the electrolyte. Such a sensor is described in U. S. Pat. No. 2,913,386. In this type of sensor, normally a suitable voltage is impressed across the electrodes and, in the absence of the gaseous constituent in the sample that is being analyzed, the electrode system becomes polarized so that the current which normally flows through the electrolyte is reduced, to nearly zero, after a short time. In the presence of the constituent in the sample that is to be analyzed, the electrode system becomes depolarized and current flows again. The magnitude of the current in these devices is a function of the rate or speed with which the constituent to be analyzed can pass through the membrane and of the diffusion processes that take place in the immediate vicinity of the system, particularly the membrane. As a consequence, the permeability characteristics of the membrane are extremely important. The nature of the membrane determines the flow sensitivity, response time and current level of the sensor. The flow sensitivity of the polarographic sensor, sometimes referred to as the "stirring effect", refers to the effect upon the output current of the sensor resulting from the depletion of oxygen in the sample in the region immediately adjacent to the cathode of the sensor. This effect is particularly noticeable in small samples of liquids and is normally overcome by continuously stirring the liquid to avoid the liquid in the region of the cathode of the sensor from being depleted of its oxygen content. The response time characteristic of the sensor refers to the time required for the sensor to respond to changing levels of oxygen content in the sample medium. The current level of the sensor refers to the magnitude of output signal of the sensor.

In conventional polarographic sensors of the type discussed above, polytetrafluoroethylene [TFE] has been most widely utilized since it allows relatively rapid passage of oxygen therethrough yet is relatively impermeable to electrolyte. Other membrane materials which have been utilized are polyethylene, polypropylene and silicone rubber. Silicone rubber is advantageous in that it is highly permeable to oxygen, but it has the disadvantage that it is more permeable to water vapor than the other membranes mentioned above. As a result, the electrolyte in a polarographic sensor employing a silicone rubber membrane dries out in a relatively short period of time, thus limiting the life of the sensor.

Prior to the present invention, to our knowledge no membranes were available which provided a polarographic sensor with all the desirable characteristics of low flow sensitivity, short response time, and adequate current level of the sensor over an acceptable period of time. The choice of presently available membranes result in a trade-off between one or more of these characteristics. Normally, membranes which provide minimal flow sensitivity result in the sensor having a slow time response, relatively low output current or allow the electrolyte to dry out rapidly and membranes which provide a fast time response usually produce high flow sensitivity.

U. S. Pat. No. 3,098,813 to Beebe et al. discloses that a marked reduction in the flow sensitivity of a polarographic sensor may be obtained by employing a membrane consisting of two layers of polyethylene. As will appear later, while such a membrane arrangement substantially reduces the flow sensitivity of the sensor, it increases the response time to such a degree that the sensor would not be practical for many applications. Another two-layer membrane arrangement for a polarographic sensor is disclosed in U.S. Pat. No. 3,278,408 to Leonard et al. In this sensor, an outer silicone rubber member is utilized to hold a free floating TFE inner membrane adjacent to the cathode of the sensor. As a result, only the silicone rubber membrane closes the electrolyte chamber in the sensor and hence the electrolyte will dry out more rapidly than when a TFE or other like membrane is employed for closing the electrolyte chamber. We have found, as will be discussed in detail further below, that when care is taken in mounting the two membranes in a Leonard et al. type sensor, the sensor will have a relatively fast response time as well as low flow sensitivity. However, after a relatively short time the current output and response time of the sensor decrease substantially and the output current becomes noisy. This is believed to be caused by electrolyte within the sensor migrating between the two membranes in the area of the cathode thereby affecting the electrical characteristics of the sensor.

Accordingly, what is needed is a membrane for a polarographic sensor which will provide a good time response, minimal flow sensitivity and adequate current level over an extended period of time.

SUMMARY OF THE INVENTION

It is a principal object of the present invention to provide a polarographic sensor embodying an improved membrane arrangement.

Another object of the invention is to provide a composite multi-layer membrane for a polarographic sensor which is easy to handle and embodies more desirable characteristics than membranes heretobefore utilized.

According to the principal aspect of the present invention, there is provided in a polarographic sensor of the general type described hereinabove a multi-layer gas permeable, essentially ion impermeable membrane the layers of which are held under tension over the sensing electrode of the sensor. The layers are held together so as to prevent migration of electrolyte therebetween to the region overlying the sensing electrode and to prevent the trapping of gas or liquid between the layers in such region. The outer layer of the membrane is preferably formed of silicone rubber while the inner layer is less permeable to gas and water vapor than the outer layer, and may be TFE, fluorinated ethylene propylene [FEP] or any of the other materials which will be mentioned later. Preferably the layers of the membrane are bonded together to form a composite membrane sandwich which facilitates the mounting of the membrane on the sensor. We have found that a polarographic sensor employing such a membrane is characterized by having not only a rapid response time and adequate current level, but also minimal flow sensitivity over an extended period, thus rendering the sensor ideal for most all applications.

Other objects, aspects and advantages of the invention will become apparent from the following description taken in connection with the accompanying drawing.

BRIEF DESCRIPTION OF THE DRAWING

FIG. 1 is a longitudinal partial sectional view, somewhat enlarged, of one embodiment of the polarographic sensor of the present invention employing a composite multi-layer membrane;

FIG. 2 is a perspective view of the membrane utilized in the sensor illustrated in FIG. 1;

FIG. 4 is an end view of a preferred form of the cathode assembly for use in the present invention.

DESCRIPTION OF THE PREFERRED EMBODIMENTS

Figure 3:
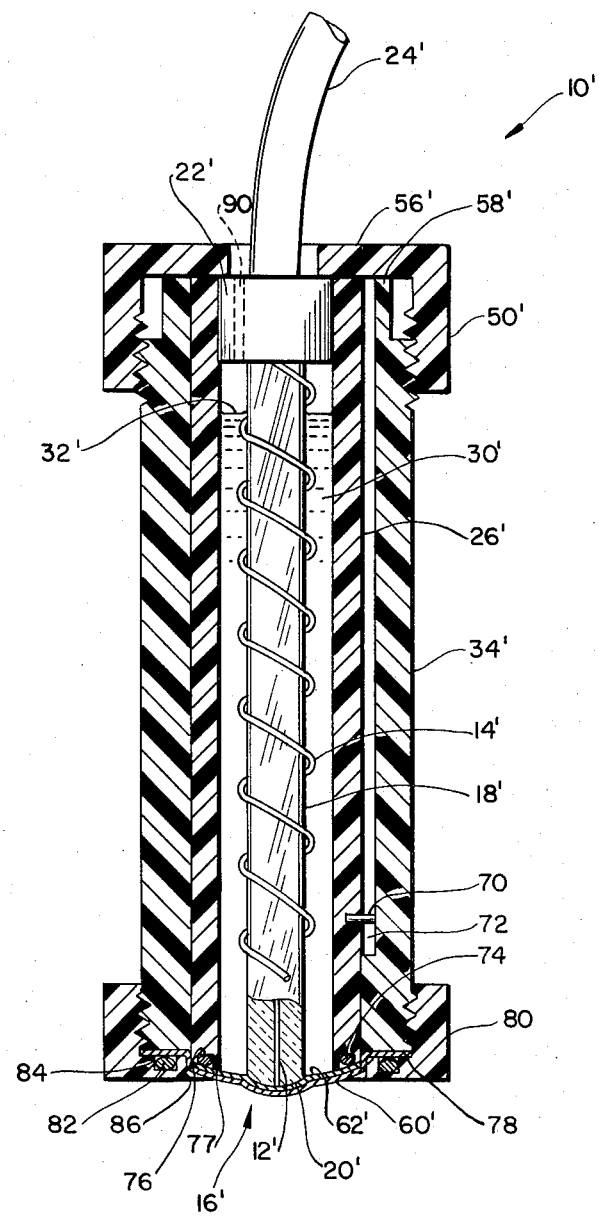
FIG. 3 is an enlarged, longitudinal, partial sectional view of a second embodiment of the sensor of the present invention employing a membrane formed of separate layers.

Referring now to FIGS. 1–3 of the drawings in detail, the preferred form of the polarographic sensor of the present invention, generally designated 10, comprises a sensing electrode 12 and a second electrode 14 which are separated from the sample medium by means of a composite multi-layer membrane 16. The sensing electrode 12 is in the form of a wire which is embedded in a plastic or glass body 18. The end of the electrode is flush with the rounded lower end 20 of the body. The second electrode 14 is a wire helically wound about the body 18. The wires 12 and 14 extend into the upper enlarged end 22 of the body 18 where they are connected to the conductors [not shown] of a cable 24 which is adapted to be connected to a suitable current measuring device.

The body 18 is coaxially positioned within a cylindrical sleeve 26 with the upper end 22 of the body slidably received in a counterbore 28 in the upper end of the sleeve. The annular space 30 between the inner surface of sleeve 26 and the outer surface of the body 18 provides a reservoir for electrolyte 32. The sleeve 26 is threadedly received in an outer casing 34 which is formed with a central opening 36 at its lower end 38 coaxial with the electrode 12. A slot 39 is formed in the upper end 40 of the sleeve to receive a tool for facilitating threading of the sleeve into the casing. The membrane 16 lies on the lower end of the casing 34 and extends across the reservoir 30 and opening 36. An elastomeric sealing ring 41 is positioned in an annular groove 42 formed in the sleeve 26 adjacent to its lower end 44. When the sleeve is threaded down into the casing, the ring 41 is compressed against the membrane adjacent to its outer periphery so that the membrane will physically and electrically isolate the electrolyte 32 and electrodes 12 and 14 from the sample medium outside of the sensor.

A cap 50 is threaded onto the upper end of the casing. The cable 24 passes through a vertically extending passage 52 in the top 54 of the cap. As will be noted, the length of body 18 between the bottom 51 of the enlarged end 22 and the lower end 20 is slightly greater than the distance between the bottom 55 of bore 28 and the lower end 44 of the sleeve 26. Also, the length of the upper end 22 of the body is slightly greater than the depth of bore 28. Thus, when the cap 50 is threaded onto the casing 34, the top 54 of the cap will engage the top 56 of the body 18 urging its lower end 20 beyond the end 44 of the sleeve thereby causing the membrane 16 to become tightly stretched over the electrode 12 in the body. It is noted that the length of body 18 should not be so great that the membrane 16 will be ruptured by the body when it is fixedly secured in the sleeve 26 by the cap. Before assembling the sensor, electrolyte is applied to the inner surface of membrane 16 so that a thin electrolyte film will be provided between the sensing electrode 12 and membrane when the sensor is fully assembled. Care must be taken, however, to avoid any bubbles in the electrolyte film adjacent to sensing electrode 12 since bubbles there will adversely affect the output of the sensor.

When the sensor 10 is used for the determination of the partial pressure of oxygen in a sample, the sensing electrode or cathode 12 may be formed of gold, rhodium, or other noble metal, the electrode 14 may be formed of silver and electrolyte 32 is then suitably a potassium chloride solution. As well known in the art, a suitable polarizing potential is impressed across the electrodes from an external circuit, not shown, so that when oxygen diffuses through the membrane 16 into the electrolyte film between the membrane and electrode 12, the oxygen is reduced at the electrode, thereby producing a current which is an indication of the partial pressure of oxygen in the sample medium being analyzed. Also, as is well known in the art, the external voltage source may be eliminated if the electrodes are formed of materials which produce an electrical voltage potential therebetween of proper magnitude. For example, the electrode 12 may be formed of gold, silver or other noble metal and the electrode 14 of zinc, cadmium or lead and the electrolyte may be potassium hydroxide solution.

In accordance with the present invention, the membrane 16 is comprised of two layers, an outer layer 60 and an inner layer 62. The outer layer 60 is preferably formed of silicone rubber or any other material having the gas and electrolyte permeability characteristics of silicone rubber. Silicone rubber is well known to be highly permeable to oxygen and other gases. The inner layer 62 is formed of a material which is less permeable to gas and to water vapor than the outer silicone rubber layer. For example, the inner layer 62 may be formed of polyethylene, polypropylene or a polymer of a fluorinated alkane. Preferably the inner layer is formed of TFE or FEP.

It is an important feature of the invention that the two layers are sealed together so as to prevent migration of electrolyte 32 or gas therebetween to the region overlying the sensing electrode 12. Preferably, this is accomplished by bonding the two layers 60 and 62 together by a suitable adhesive to provide a composite membrane sandwich which may be easily handled and assembled in the sensor 10 by the user. Such bonding techniques are well known in the art. For example, they are used in the manufacture of gas impermeable thick silicone rubber-TFE septums which are utilized in the sample inlet ports of gas chromatographs.

Reference is now made to FIG. 3 of the drawings wherein a modified form of the sensor of the present invention is illustrated which employs a multi-layer membrane comprised of separate sheets, in contrast to the bonded layers employed in the membrane 16 hereinbefore described. In this embodiment, the basic structure is as previously described and like numbers primed are used to indicate like or corresponding parts. In the sensor 10' illustrated in FIG. 3, the sensing electrode 12' is embedded in an insulating body 18' and the second electrode 14' is helically wound about the body. The electrodes extend into the upper enlarged end 22' of the body 18' where they are connected to conductors (not shown) in the cable 24'.

The body 18' is coaxially mounted within a cylindrical sleeve 26', with an annular space 30' being provided between the two elements to hold electrolyte 32'. The sleeve 26' is slidably received in a cylindrical casing 34'. The sleeve 26' carries a pin 70 which is slidably received in a longitudinally extending key slot 72 formed in the inner surface of the casing 34' so that relative longitudinal sliding movement is permitted between the sleeve and the casing, but relative rotational movement is prevented.

The outer layer 60' and inner layer 62' of the membrane 16' comprise separate sheets formed of the same materials as the layers 60 and 62, respectively, described hereinbefore. However, the outer layer has a greater diameter than the inner layer. As in the sensor 10 illustrated in FIG. 1, the inner layer 62' of the membrane 16' extends across the end of the sleeve 26' to close the electrolyte reservoir 30'. The outer periphery of the inner layer 62' terminates at the outer surface of the sleeve 26'. An elastomeric sealing ring 74 is positioned in an annular groove 76 formed in the lower end 77 of the sleeve 26' to provide a seal between the sleeve and the inner layer 62' to prevent leakage of electrolyte outside of the reservoir 30'.

The outer periphery of the layer 60' of the membrane overlies the lower end 78 of the casing 34'. A lower cap 80 is threaded onto the lower end of the casing 34' to clamp therebetween the outer layer 60' of the membrane. An elastomeric sealing ring 82 is positioned in an annular groove 84 formed in the inside lower portion of the cap 80. A circular aperture 86 coaxial with the body 18' is formed in the lower end of the cap 80. The diameter of the aperture 86 is slightly greater than the outer diameter of the sleeve 26'. The lower end 78 of the casing 34' is spaced slightly behind or above the lower end 77 of the sleeve 26'.

To assemble the sensor 10', the lower cap 80 is screwed onto the casing 34', without the body 18' or sleeve 26' being in the casing, to hold the outer layer 60' of the membrane thereon. Thereafter, the inner layer 62' is dropped through the open upper end of casing 34' onto the outer layer 60'. A drop of electrolyte is then placed on inner layer 62'. The body 18' and sleeve 26' are then mounted in the casing so that a thin film of electrolyte is formed between lower end 20' of the body and inner layer 62'. Upper cap 50' is then threaded onto the upper end of the casing. Since the top 56' of the cap 50' engages the upper ends of the body 18' and sleeve 26', the casing will be lifted upwardly, as viewed in FIG. 3, when the cap 50' is threaded thereon, whereby the outer layer will be drawn tightly over the lower end 77 of sleeve 26' and inner layer 62' will be held in sealing engagement against the lower end of the sleeve. Then the electrolyte 32' is delivered into the sensor through opening 90 in the upper end 22' of body 18' by means of a syringe or the like.

As in the sensor 10 illustrated in FIG. 1, the body 18' of the sensor 10' is slightly longer than the sleeve 26' so that its lower end 20' extends beyond the lower end 77 of the sleeve. Hence, when cap 50' is threaded into the casing, membrane 16' becomes stretched over the lower end 20' of the body 18'. Since the outer periphery of the inner layer 62' of the membrane is not sealed to the outer layer 60', any air that might have previously been trapped between the two layers is forced out between the layers. It will be noted that the casing 34' is sufficiently long that the top 56' of the cap 50' will engage the upper end 58' of the casing before the membrane 16' is stretched to such an extent over the body 18' as to cause it to rupture.

It will be appreciated from the foregoing description of the sensor 10' that there is provided an arrangement for mounting the two layers of the membrane 16' over the sensing electrode 18' in a manner so as to prevent gas and electrolyte from being trapped between the layers adjacent to the sensing electrode 12'. Also, because the inner plastic layer 62' closes the electrolyte chamber 30', loss of electrolyte vapor through the membrane 16' will be minimized.

It is most convenient that the thickness of the silicone rubber outer membrane in both of the sensors 10 and 10' be such that the inner membrane 62 be the sole limiting factor on the output current and response time of the sensors. This may be achieved by making the thickness of the silicone rubber layer no greater than about twenty times that of the inner layer. In other words, if the inner layer is 1 mil thick, the outer layer should be less than 20 mils thick. Also, to obtain rapid response and suitable output current, it is preferred that the thickness of the inner layer be no greater than about 2 mils. We have found that when employing in a sensor a TFE or FEP inner layer and silicone rubber outer layer, excellent results can be achieved by making the inner layer between 0.5 and 1 mil thick and the outer layer between 3 and 6 mils thick. We have also found that the flow sensitivity of the sensor is reduced by dividing the sensing electrode into a plurality of spaced elements, as indicated by reference numeral 12'' in FIG. 4 of the drawing.

The membrane orientation is also important. The silicone rubber layer must be on the outside to contact the sample medium while the other plastic layer (TFE, FEP, etc.) must be the inner layer adjacent to the sensing electrode. If the membrane 16 is reversed, the response time of the sensor increases 2 to 10 fold.

The advantages of the present invention can best be appreciated from the following examples of specific tests conducted on sensors constructed in accordance with the present invention and on other sensors, some of which were constructed in accordance with the teachings of the prior art. The tests referred to in Examples 2–8 were conducted in essentially the same manner as that described in Example 1, except on different sensors as will be described.

Example 1

A polarographic sensor similar to that disclosed in U. S. Pat. No. 3,449,231 to Adams et al. was employed having a 5 mil diameter rhodium wire cathode embedded in a glass supporting body and a silver-silver chloride anode. The electrolyte joining the electrodes was about 3 percent potassium chloride. A composite membrane sandwich was employed having a 3 mil thick silicone rubber outer layer and 1 mil thick TFE inner layer. The sensor was first tested in air at 24°C. The oxygen content of air at atmospheric level is about 21 percent. The current output from the sensor was 13.5 nanoamps. The sensor was then sealed into a small glass container into which nitrogen gas was fed at a sufficiently high rate so that the oxygen content within the container reduced to essentially zero in a matter of a few seconds. The output signal of the sensor was indicated on a recorder strip chart so that the time required for the output signal of the sensor to reach different oxygen levels could be determined. The output of the sensor indicated 0.25 percent oxygen within 60 seconds. The sensor was then removed from the container so that it would be in contact with air. The output signal of the sensor indicated about 21 percent oxygen within slightly less than 30 seconds. This test was immediately repeated and essentially identical results were achieved. Thus, it can be seen that the response time of the sensor to changes in oxygen concentrations was very rapid. In order to test the flow sensitivity of the sensor, the sensor was immersed in water which was continuously aerated. The temperature of the water was about 19°C. The current output of the sensor was adjusted to indicate 21 percent oxygen. The water was then stirred in order to eliminate the effect of the oxygen depletion in front of the cathode. The output of the sensor indicated an oxygen level of 21⅝ percent. Thus, the flow sensitivity of the sensor between stirred and unstirred conditions was only ⅝ percent oxygen. This value is extremely small as compared to that produced by sensors employing conventional membrane arrangements as will be seen from the following examples. Similar results were achieved with the same sensor in air and water over periods of 2 weeks, without recharging the sensor with electrolyte. Similar results have also been achieved by sensors utilizing a membrane having a 3 mil thick silicone rubber outer layer and 1 mil thick FEP inner layer.

Example 2

A test was conducted on a sensor like that described in Example 1 except that the membrane was reversed so that the TFE layer was disposed on the outside to contact the sample medium while the silicone rubber membrane was on the inside. The output current of the sensor in air was 21 nanoamps. Upon subjecting the sensor to a nitrogen atmosphere, the output of the sensor indicated 0.25 percent oxygen within five minutes. When the sensor was returned to air, the output thereof read 17.5 percent oxygen within two minutes. The flow sensitivity of the sensor was ⅛ percent oxygen. This test establishes clearly that the orientation of the membrane is important in order to achieve rapid response as well as low flow sensitivity.

Example 3

A test was conducted on a sensor as illustrated in FIGS. 1 and 4 wherein four 2 mil diameter spaced rhodium wires were employed as the cathode and a membrane as described in Example 1 was utilized with the silicone rubber layer on the outside. The output current of the sensor in air was 21 nanoamps. Upon subjecting the sensor to a nitrogen atmosphere, the output of the sensor indicated 0.25 percent oxygen within slightly over 30 seconds. Upon returning the sensor to air, the sensor indicated about 21 percent oxygen within 30 seconds. The flow sensitivity of the sensor was about ¼ percent oxygen. By comparing these results with those appearing in Example 1, it can be seen that the flow sensitivity of the sensor employing four spaced 2 mil wires are improved over that of the sensor using a single 5 mil wire cathode. Similar results were achieved in the same sensor in air and water over periods of greater than 2 weeks without recharging the sensor with electrolyte.

Example 4

A test was conducted on a sensor like that described in Example 3 except that the membrane was reversed so that the TFE layer was on the outside. The outside current of the sensor in air was 32 nanoamps. Upon subjecting the sensor to a nitrogen atmosphere, the output reading of the sensor reached 0.25 percent oxygen in about 4.5 minutes. The flow sensitivity of the sensor was about ½ percent. In comparing this data with that appearing in Example 3, it is seen again that the orientation of the membrane is important in order to achieve a rapid response time.

Example 5

A test was conducted on a sensor like that described in Example 1 except that the TFE layer of the membrane was 2 mils thick rather than 1 mil. The output current of the sensor in air was 8 nanoamps. When the sensor was subjected to the nitrogen atmosphere, the output of the sensor indicated 0.25 percent oxygen in 5 minutes 10 seconds. When the sensor was returned to air, the output thereof read about 21 percent oxygen in 4 minutes 30 seconds. The flow sensitivity was not tested since the time response of the sensor was excessive for most laboratory applications. It can be seen by comparing this data to the data appearing in Example 1 that by increasing the thickness of the TFE layer of the membrane, the output current of the sensor is reduced and the time response increased. The output current could be increased by increasing the size of the cathode; however, this would result in an increase in the flow sensitivity of the sensor.

Example 6

A test was conducted on a sensor like that described in Example 1 except that only a single layer membrane of 1 mil TFE was employed as is the normal practice. The output current of the sensor in air was 23 nanoamps. Upon subjecting the sensor to the nitrogen atmosphere, the output of the sensor indicated 0.25 percent oxygen in 1 minute. Upon returning the sensor to air, the output thereof reached about 21 percent oxygen in 32 seconds. The response time of the sensor was good for many applications. However, the flow sensitivity between stirred and unstirred conditions was 3 percent oxygen, which is substantially greater than that of the sensors constructed in accordance with the present invention as seen from the data appearing in Examples 1 and 3.

Example 7

A test was conducted on a sensor like that described in Example 3 except that the membrane comprised a single layer of 1 mil TFE. The output current of the sensor in air was 18 nanoamps. When the sensor was subjected to a nitrogen atmosphere, the output thereof indicated 0.25 percent oxygen in 30 seconds thus showing a rapid response time. However, the flow sensitivity of the sensor was between 1.25 percent and 1.5 percent which is substantially greater than that of the like sensor employing the two layer membrane of the present invention referred to in Example 3.

Example 8

A test was conducted on a sensor like that described in Example 3 except that the membrane comprised two layers of ½ mil TFE. The output current of the sensor in air was 27 nanoamps. When the sensor was subjected to the nitrogen atmosphere, the output of the sensor reached 1.5 percent oxygen in 7 minutes. The flow sensitivity of the sensor was about 0.5 percent oxygen. While the flow sensitivity was low, the response time of the sensor was considerably greater than a sensor employing a single 1 mil layer of TFE as described in Example 7 or a like sensor employing the membrane of the present invention as described in Example 3. While this test would appear to confirm the statements appearing in the aforementioned Beebe et al. patent that the use of a two layer membrane of the same plastic material produces less flow sensitivity than a single layer membrane of the same thickness and material, such conclusion cannot be supported by general laws of gas diffusion through membranes. We believe that the reduced flow sensitivity is caused by a layer of air being trapped between the two layers of the membrane. Such an air layer would also explain the substantially increased response time of the sensor.

Example 9

A test was conducted on a sensor like that illustrated in FIG. 1 employing an outer membrane of 5 mils silicone rubber and an inner free floating membrane of 1 mil TFE as taught in the aforementioned Leonard et al. patent. Upon shifting the sensor from air to a nitrogen atmosphere, the output of the sensor reaches 0.25 percent oxygen in about one minute. However, after the sensor was subjected to air for about 2 or 3 hours, its output signal decreased by about one third and the noise level of the output signal was about ½ percent oxygen. The sensor was then returned to a nitrogen atmosphere and it required 3 minutes before the sensor reached 1 percent oxygen reading. The sensor was then placed in water and allowed to sit for 1 hour. The output current of the sensor increased and the noise of the signal decreased to a level of about 0.07 percent oxygen. The sensor was then returned to air and thereafter subjected to a nitrogen atmosphere. The output of the sensor reached 0.25 percent oxygen in about one minute. The sensor was again placed in air and after 1 hour the output signal of the sensor decreased appreciably and drifted as before. Again the sensor was placed in water and after several minutes the current started to increase. After 1 hour the output current of the sensor was back to approximately the original level. The flow sensitivity of the sensor was essentially the same as that achieved by using the membrane arrangement of the present invention. However, as established by this test, a sensor of the type described in the Leonard et al. patent has the disadvantage that when it is left in air over 2 hours, its output signal decreases and becomes noisy. This is believed to be caused by electrolyte in the sensor migrating between the free floating inner TFE membrane and the outer silicone rubber membrane shortly after the sensor is charged with electrolyte and, when the sensor is exposed to a gas atmosphere, the electrolyte film between the two membranes dries out thereby adversely effecting the operating characteristics of the sensor when utilized for analyzing gas samples. While the condition of the sensor can be revived by immersing it in water, it is clear that the sensor fails to exhibit the advantageous characteristics of the sensor of the present invention for analyzing gases over extended periods. In addition, because the silicone rubber membrane in the sensor utilized in this test is in direct contact with the electrolyte within the sensor, the electrolyte will dry out much more rapidly than when employing the membrane arrangement of the present invention in which the TFE or FEP inner membrane, which is substantially less permeable to water vapor than silicone rubber, closes the electrolyte chamber of the sensor.

From the foregoing, it can be appreciated that by the present invention a polarographic sensor is provided which is characterized not only by rapid response time but minimal flow sensitivity over periods exceeding two weeks and generally as long as 1 month. In addition, the output current of the sensor will be at an adequate level for most applications and the electrolyte within the sensor will not evaporate rapidly. The sensor can be employed equally well for analyzing gases and liquids. In addition, we have found that changing temperature conditions do not appreciably effect the performance of the sensor.

Although we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent structures, devices and materials.

What is claimed is:

1. In a polarographic sensor for determining the partial pressure of a gas in a sample medium, a pair of spaced electrodes adapted to be joined by an electrolyte, one of said electrodes being a sensing electrode, a multi-layer gas permeable-essentially ion impermeable membrane positioned to separate said electrodes and electrolyte from the sample medium and said membrane being stretched over said sensing electrode, wherein the improvement comprises:

means holding the layers of said membrane together so as to prevent migration of electrolyte therebetween to the region overlying said sensing electrode and to prevent the trapping of fluid between said layers in said region;

the outer layer of said membrane adapted to contact said sample medium having gas and electrolyte permeability characteristics approximating that of silicone rubber; and an inner layer of said membrane being hydrophobic and less permeable to said gas and to water vapor than said outer layer, said inner layer entirely covering said sensing electrode and being the diffusion limiting layer of the membrane.

2. A sensor as set forth in claim 1 wherein:
said inner layer is selected from the group consisting of polyethylene, polypropylene and a polymer of a fluorinated alkane.

3. A sensor as set forth in claim 1 wherein:
said inner layer is either polytetrafluoroethylene or fluorinated ethylene propylene.

4. A sensor as set forth in claim 1 wherein:
the thickness of said outer layer is less than the product of the thickness of said inner layer and 20.

5. A sensor as set forth in claim 4 wherein:
the thickness of said inner layer is less than about 2 mils.

6. A sensor as set forth in claim 3 wherein:
the thickness of said inner layer is between about 0.5 and 1 mils; and
the thickness of said outer layer is between about 3 and 6 mils.

7. A sensor as set forth in claim 1 wherein:
said sensing electrode is composed of a plurality of spaced wires imbedded in an insulating element and exposed at one end adjacent to said membrane.

8. A sensor as set forth in claim 1 wherein:
said holding means comprises means bonding said layers together at their mating surfaces to provide a composite multilayer membrane sandwich.

9. A sensor as set forth in claim 1 wherein:
said inner and outer layers are separate sheets;
said sensor including a body having a cavity therein receiving said electrodes and adapted to hold said electrolyte;
said inner layer being positioned to close said cavity;
said holding means clamping said outer layer under tension over said inner layer to hold inner layer against said body in sealing engagement therewith; and
the outer periphery of said inner layer being disposed inside said holding means so that air may escape from between said layers when said layers are mounted onto said body by said holding means.

* * * * *